United States Patent [19]
Kang et al.

[11] Patent Number: 5,239,395
[45] Date of Patent: Aug. 24, 1993

[54] TRANSMISSION/COPY METHOD AND DEVICE FOR A TWO-WAY SCANNING FACSIMILE

[75] Inventors: Jong-seok Kang; Jae-seung Shin, both of Seoul, Rep. of Korea

[73] Assignee: Goldstar Co., Ltd., Rep. of Korea

[21] Appl. No.: 617,021

[22] Filed: Nov. 21, 1990

[30] Foreign Application Priority Data

Nov. 28, 1989 [KR] Rep. of Korea .............. 17354/1989
Nov. 30, 1989 [KR] Rep. of Korea .............. 17685/1989

[51] Int. Cl.$^5$ .............................................. H04N 1/12
[52] U.S. Cl. .................................... 358/498; 358/496; 355/23
[58] Field of Search ............ 358/440, 496, 498, 497, 358/444; 379/100; 355/308, 23

[56] References Cited

U.S. PATENT DOCUMENTS

| | | | |
|---|---|---|---|
| 4,811,053 | 3/1989 | Ito et al. .......................... | 355/308 |
| 4,816,872 | 3/1989 | Okamoto et al. ............... | 355/23 |
| 4,823,376 | 4/1989 | Takahashi ....................... | 379/100 |
| 5,157,521 | 10/1992 | Chung ............................ | 358/496 |

FOREIGN PATENT DOCUMENTS

| | | | |
|---|---|---|---|
| 58-17768 | 2/1983 | Japan ............................. | 358/498 |
| 62-130063 | 6/1987 | Japan . | |
| 63-123741 | 5/1988 | Japan . | |
| 2-285764 | 11/1990 | Japan . | |

*Primary Examiner*—Edward L. Coles, Sr.
*Assistant Examiner*—Kim Yen Vu
*Attorney, Agent, or Firm*—Anthony J. Casella; Gerald E. Hespos

[57] ABSTRACT

A facsimile/copy apparatus and method of operation are provided for transmitting a single page document to a plurality of different locations, for transmitting a plural page document to a single location and or for making photostatic copies. The apparatus includes a switch for selecting either a copy function or a facsimile function and memory to identify a number of readings to be performed with the selected function. Feed rollers feed each sheet into the apparatus, and a reversible transfer roller is provided to move the sheet in either of two opposed directions relative to a reader. Odd number readings are read when the sheet is moving in a first direction, while even number readings are obtained while the sheet is moving in an opposed direction. The number of readings that have been taken are compared to the number of required readings stored in the memory. After completion of the required number of readings, the sheet is ejected from the facsimile/copy apparatus.

8 Claims, 7 Drawing Sheets

TRANSMISSION/COPY METHOD AND DEVICE FOR A TWO-WAY SCANNING FACSIMILE

BACKGROUND OF THE INVENTION

The present invention relates to two-way scanning facsimile, and more particularly to a transmission/copy method and device for a two-way scanning facsimile that can transmit a text to multiple destinations and produce a plurality copies of the text without using massive memory for text storage.

In conventional technology, there was a problem that a substantially high cost was required to install a massive memory for text storage in case of a multi-address calling, and also was inconvenience that the text had to be fed again into a read device after the text was read out since the text was transferred in only one direction.

In addition, in a transmission device of a facsimile of prior art, sometimes the text transmitted was too hard for a receiving end to recognize in case where the text that was not clearly recognizable was transmitted as it was. In such case, the text was fed into the read device with function set to copy and the text was copied by a heat-sensing head, and then the copy was used for transmission. In such facsimiles, when a plurality of copies were desired, the text had to be fed as many times as the desired number of copies because one feeding of the text produced only one copy.

As stated in the foregoing, a facsimile of the prior art had very inconvenient copy function, and particularly the facsimile requiring massive memory for text storage had the setback that one selection of the copy function produced only one copy.

SUMMARY OF THE INVENTION

It is therefore an object of the present invention to provide methods and a device that not only can transmit a text to a plurality of destinations by two-way scanning of the text without a memory for text storage when the multi-destination calling is performed, but also can copy as many copies as desired by having the text move in two ways by a single selection.

BRIEF DESCRIPTION OF THE ATTACHED DRAWINGS

For a better understanding of the invention and to show how the same may be carried into effect, reference will now be made, by way of example, to the accompanying diagrammatic drawings, in which.

DETAILED DESCRIPTION OF THE INVENTION

Figure 1:
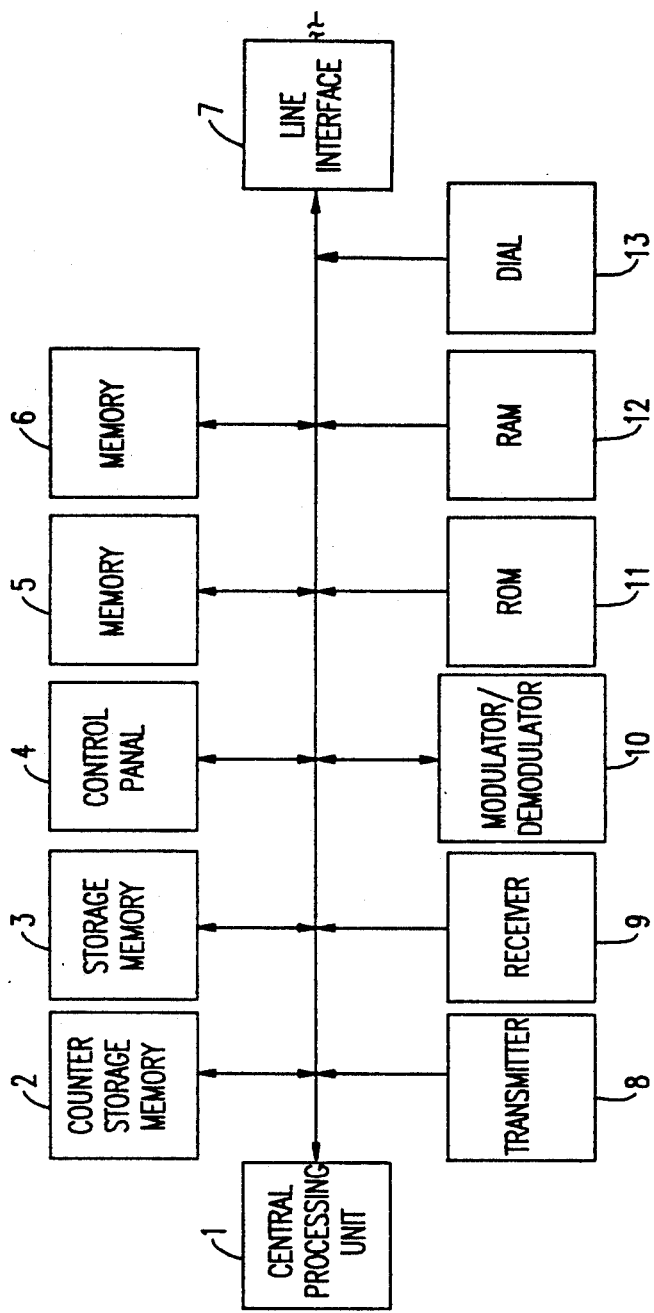
FIG. 1 is a block diagram of transmission/copy device of two-way scanning facsimile according to the present invention.

Turning now more descriptively to the drawings, FIG. 1 is a block diagram of a device according to the present invention, wherein comprises:

a control panel 4 where a plurality of telephone numbers and a plurality of number of copies can be specified for a facsimile that is capable of storing a plurality of telephone numbers and a plurality of number of copies;

a telephone numbers/number-of-copies registration and storage memory 3 capable of storing telephone numbers/number-of-copies when a plurality of the telephone numbers of destinations or the number of copies are registered and stored by using the control panel 4;

a dial 13 that can call the registered telephone numbers;

a memory 5 that senses and stores reading position of the text;

a memory 6 that senses and stores an ending of the text;

a transmitter 8 that reads the text being transmitted scanning the text in two-way(forward or backward);

a number-of-transmissions/number-of-copies counter storage memory 2 that counts and stores specified number of transmissions or number of copies while scanning the text in two-way(forward or backward);

a modulator/demodulator 10 that modulates picture data during transmission and demodulates the picture data;

a receiver 9 that records received or copied picture data;

a line interface 7 that links with subscriber lines;

a central processing unit 1 that controls the entire device;

a ROM 11 wherein device control program resides; and a RAM 12 for the device control program.

Figure 2:
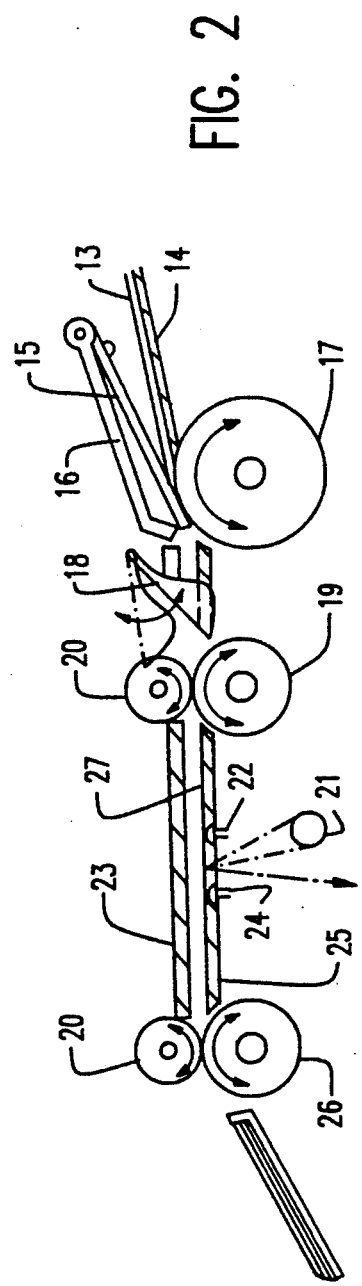
FIG. 2 is a cross-section view of the two-way scanning device according to the present invention.

FIG. 2 is a composition diagram of a two-way scanning device according to the present invention, wherein:

a frame 16 having a separation rubber board 15 attached thereto is installed at an end of a text feed tray 14 whereon a text 13 having information to be transmitted is placed; a feed roller 17 is installed below and in contact with the separation rubber board 15; a text guide 18 is installed to guide text feeding when the text is move backward; a pinch roller 20 and a transfer roller 19 are installed before a guide path 27 whereon upper and lower text guides 23, 25 are installed; a pinch roller 20 and a transfer roller 26 is installed at the other end of the guide path 27; first and second sensors 22, 24, which sense whether or not the text is fed in-between the transfer rollers 19, 26, are installed at the text guide 25 that is located below the guide path 27; and in-between the sensors 22, 24 a fluorescent lamp 21 for reading information is installed.

In the present invention having a composition as described in the foregoing, when transmission is desired, a sheet of a text 13 is placed on the text feed tray 14 and then telephone numbers and number of copies are registered in the telephone numbers/number-of-copies registration and storage memory 3 for registering and storing telephone numbers and number of copies by controlling the control panel 4.

Figure 4A:
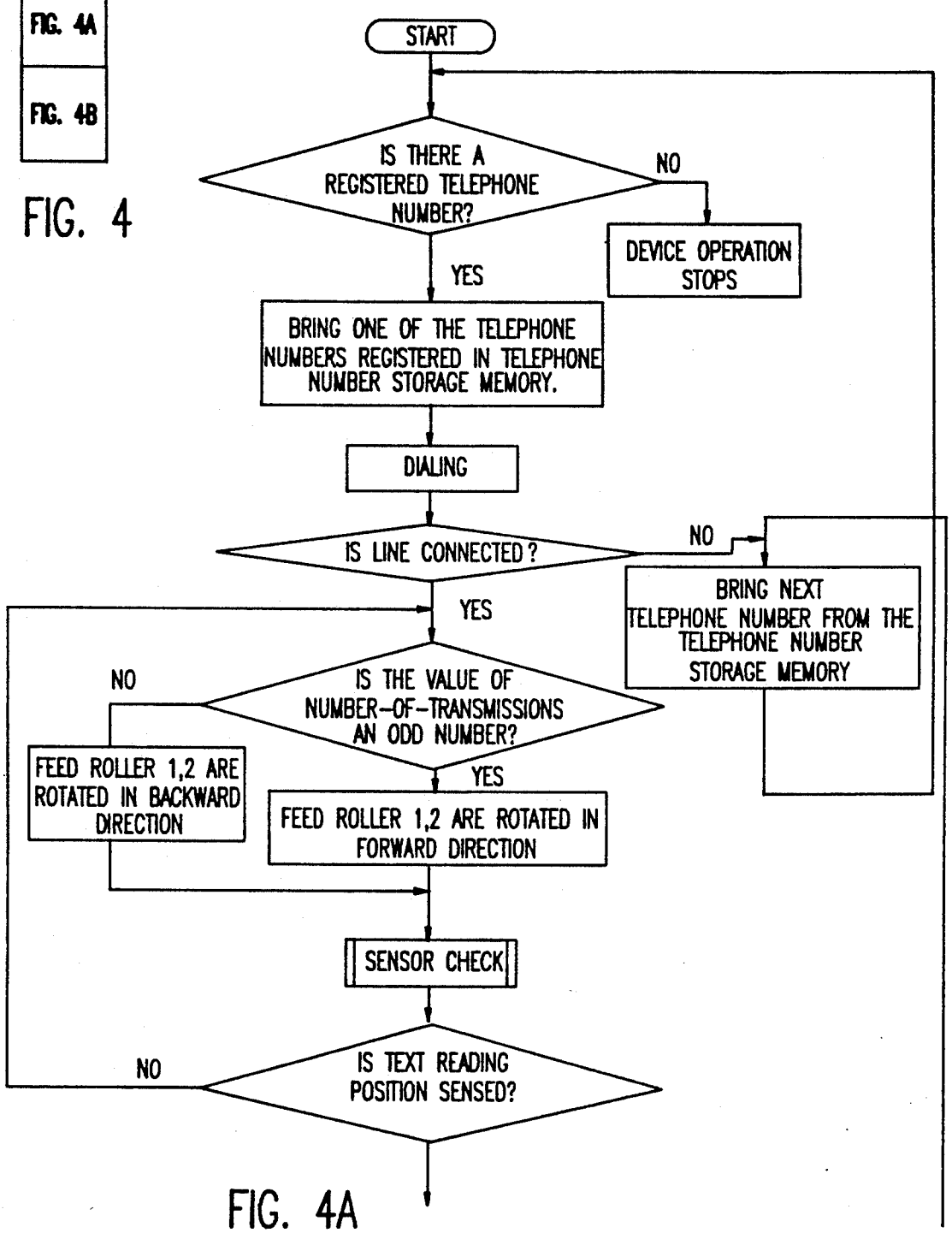
FIGS. 4A and 4B are flow diagrams of transmission method of the two-way scanning facsimile according to the present invention.
Figure 4B:
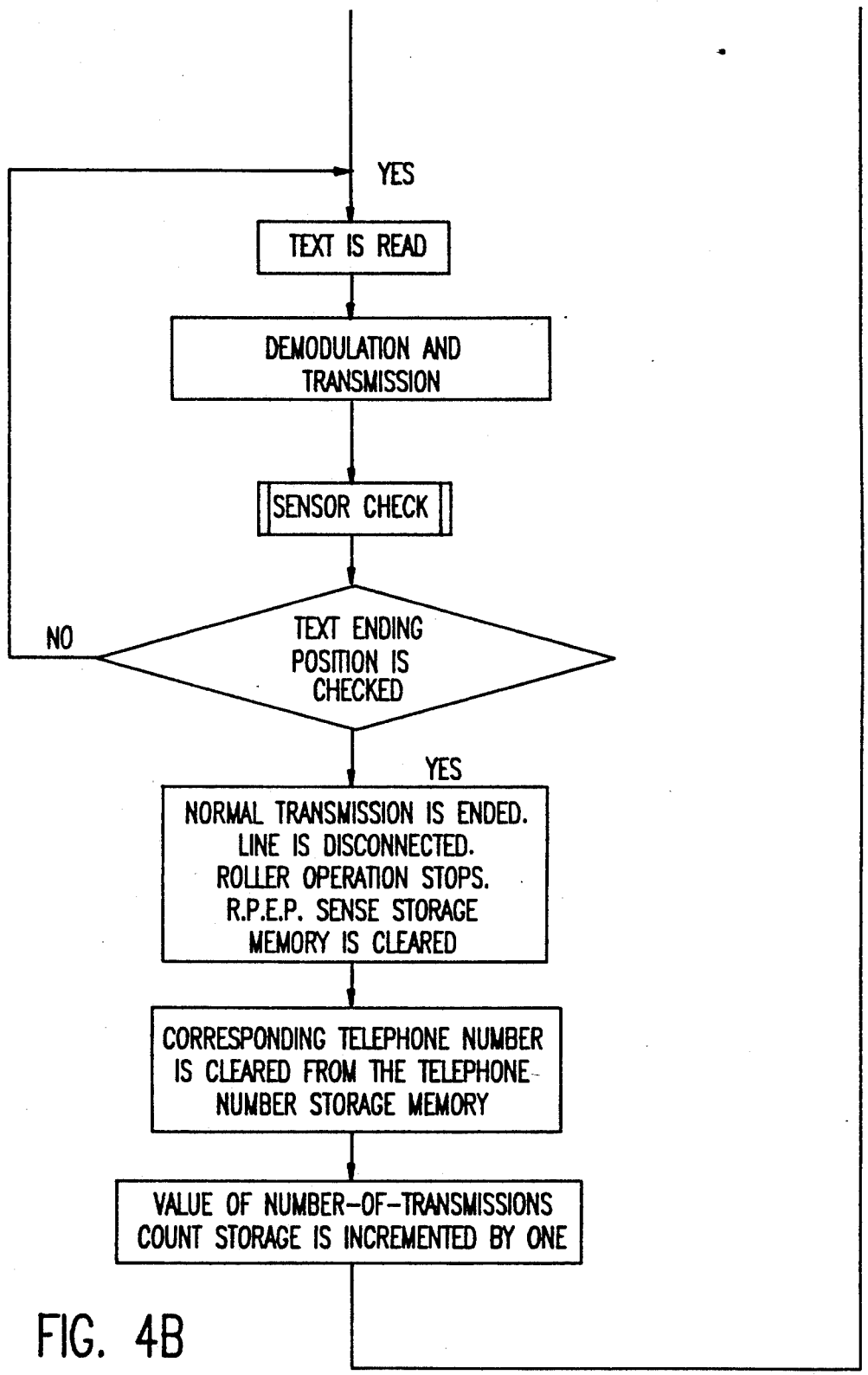
Figure 6:
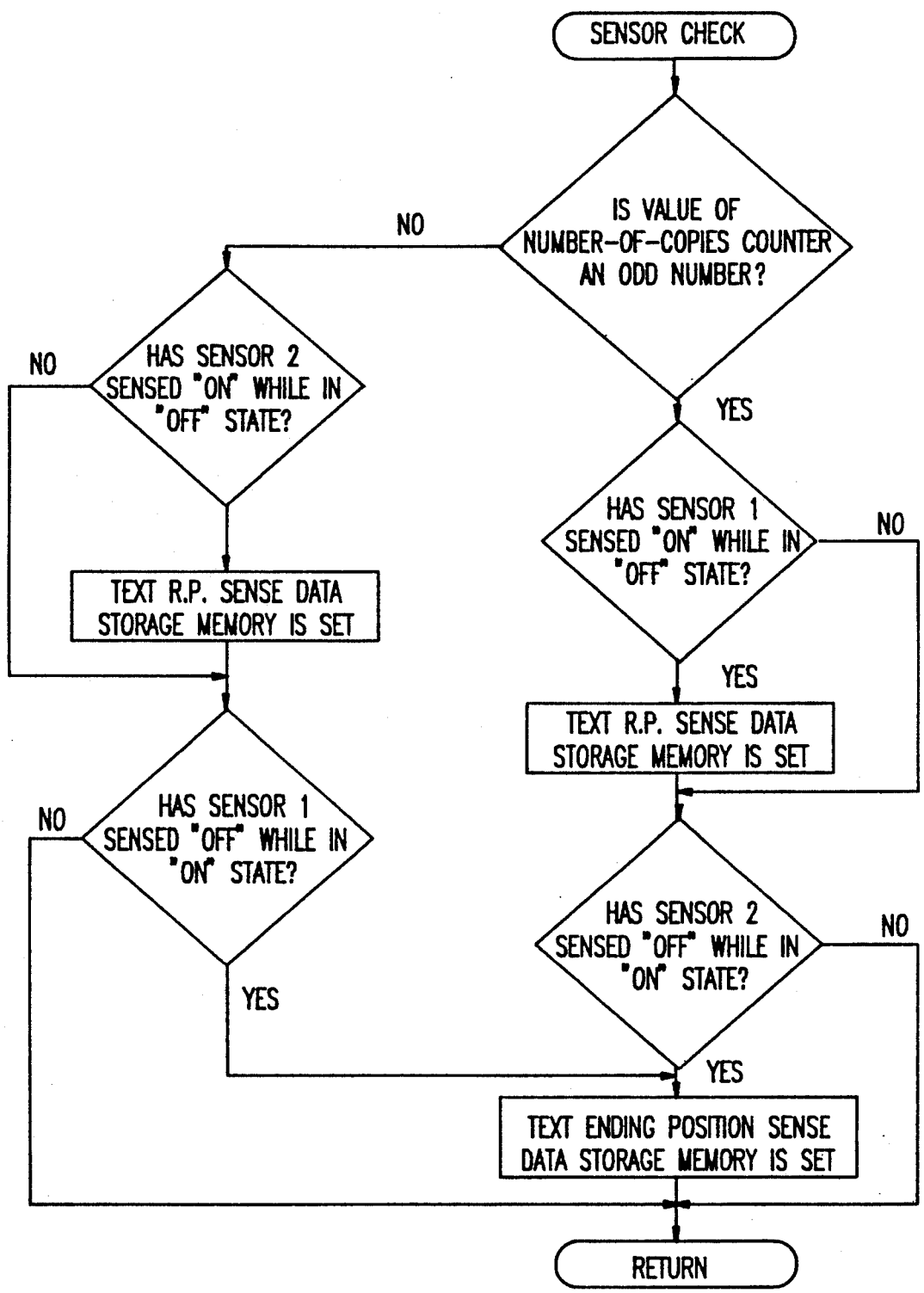
FIG. 6 is a flow diagram of a check routine of a sensor according to FIG. 4 or FIG. 5.

Then, when the multi-destination calling is performed (hereinafter refer to the flow diagrams illustrated in FIGS. 4(A) and 4(B) or FIG. 6), the device retrieves from the telephone number registration and storage memory 3 a telephone number of a destination which is registered and stored therein, and then starts to call the telephone number by using the dialing part 13.

At this time, if a line connection is not successful, a next telephone number is retrieved from the telephone number registration and storage memory 3, and then when a line connection for the next telephone number is successful, transmission is started.

And the number-of-transmissions/number-of-copies counter storage memory 2, of course, is set to 1 before transmission is performed.

For transmission, a counter value of number of transmissions is read first and, if the value is an odd number, the feed roller 17 and the transfer rollers 19, 26 are rotated in forward direction and the text 13, which is placed on the text feed tray 14, is transferred in the forward direction by the guide of the text guide 18.

At this time, the sensors 22, 24 sense whether or not the text is in reading position by checking the text, and if the text is sensed (state of the first sensor shifts from "off" to "on"), the text is read, and the read text is then modulated in the modulator/demodulator 10 and transmitted via the line interface 7, and the sensor 24 is checked continually and the text transmission continues while the text is checked for ending position.

If the ending position of the text is sensed by the second sensor 24 (state of the second sensor shifts from "on" to "off"), the roller movement is stopped, and after a normal transmission to a destination with which a link is made is ended and the line connection is disconnected, and then an appropriate telephone number registrated in the telephone number registration and storage memory 3 is cleared.

Figure 3A:
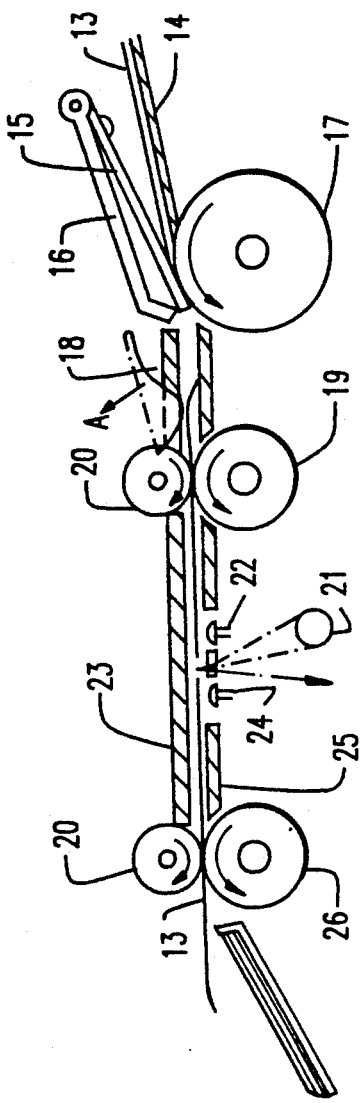
FIG. 3(A) is an embodiment of the two-way scanning device according to the present invention when a text is moved in forward direction.
Figure 3B:
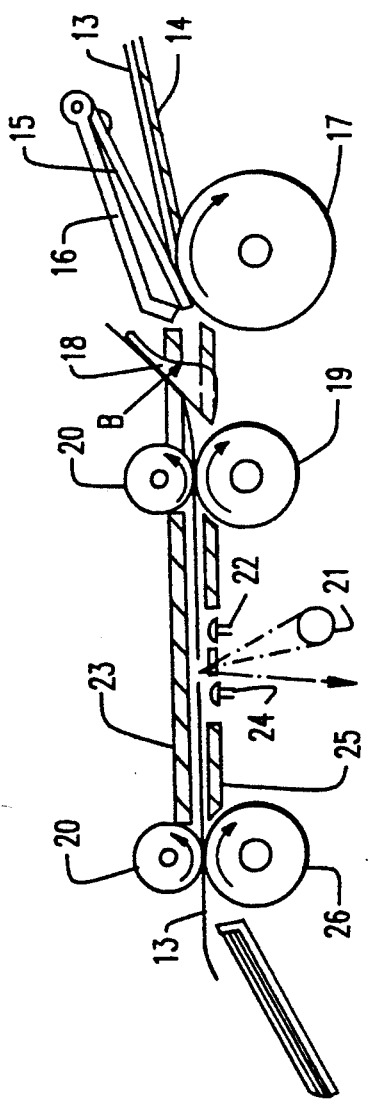
FIG. 3(B) is an embodiment of the two-way scanning device according to the present invention when the text is moved in backward direction.

And then, the value of the number-of-transmissions/number-of-copies counter storage memory 2 is incremented by +1 and in a manner as said in the foregoing a next telephone number registered in the telephone numbers/number-of-copies counter storage memory 3 is retrieved and line is connected, and then the number-of-transmissions/number-of-copies counter storage memory 2 is checked and at this time, if the checked value is an even number, the first and second transfer rollers 19, 26 are rotated in a reverse direction as described in FIG. 3(B) and reverse rotation operation is started.

And while the text 13 that is captured at the second transfer roller 26 is transferred in the reverse direction, and the first and second sensors 22, 24 are checked in the manner as said in the foregoing to determine whether or not the text 13 is in reading position, and if the text 13 is in reading position (state of the second sensor 2 shifts from "off" to "on"), the text 13 is read and the transmission starts and proceeds while checking of the sensor 22 continues.

If an ending of the text is sensed by the first sensor 22 (state of the first sensor shifts from "on" to "off"), a normal transmission is ended and then, as described in the foregoing, the multi-destination calling is performed repeatedly and when transmissions to all the registered telephone numbers are completed, the text is put out in the forward direction and the entire multi-destination calling operation is stopped.

As described in the foregoing, in the facsimile that can register a plurality of telephone numbers, multi-destination calling of prior art requires the massive text storage memory for storing the text while the present invention can perform the multi-destination calling for transmitting especially one sheet of the text to a plurality of destinations without the text storage memory for the text, by being able to execute multi-destination calling by performing the two-way scanning; thereby, cost of the facsimile can be reduced and convenience for users is realized.

Figure 5A:
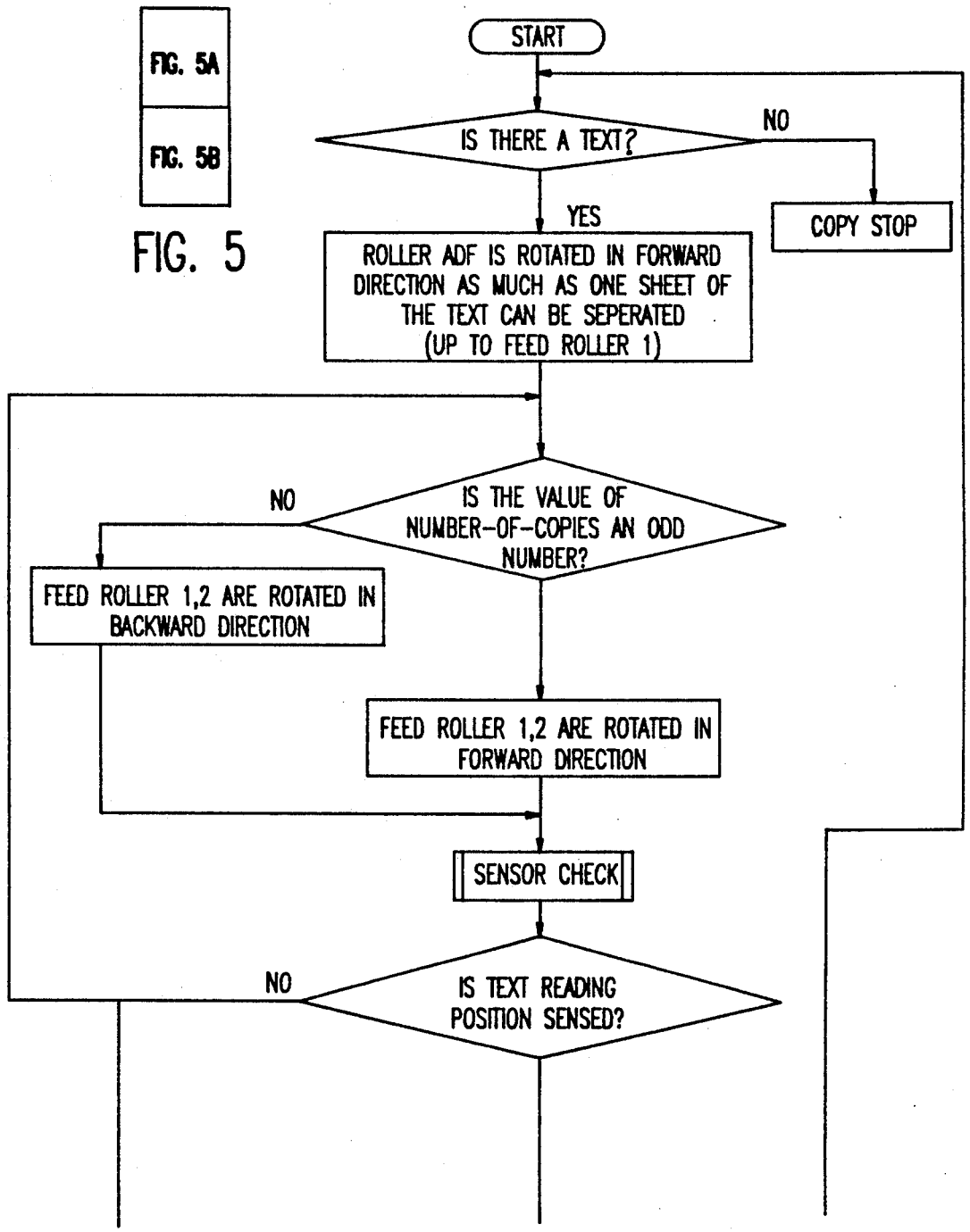
FIGS. 5A and 5B are flow diagrams of copy method of the two-way scanning device according to the present invention.
Figure 5B:
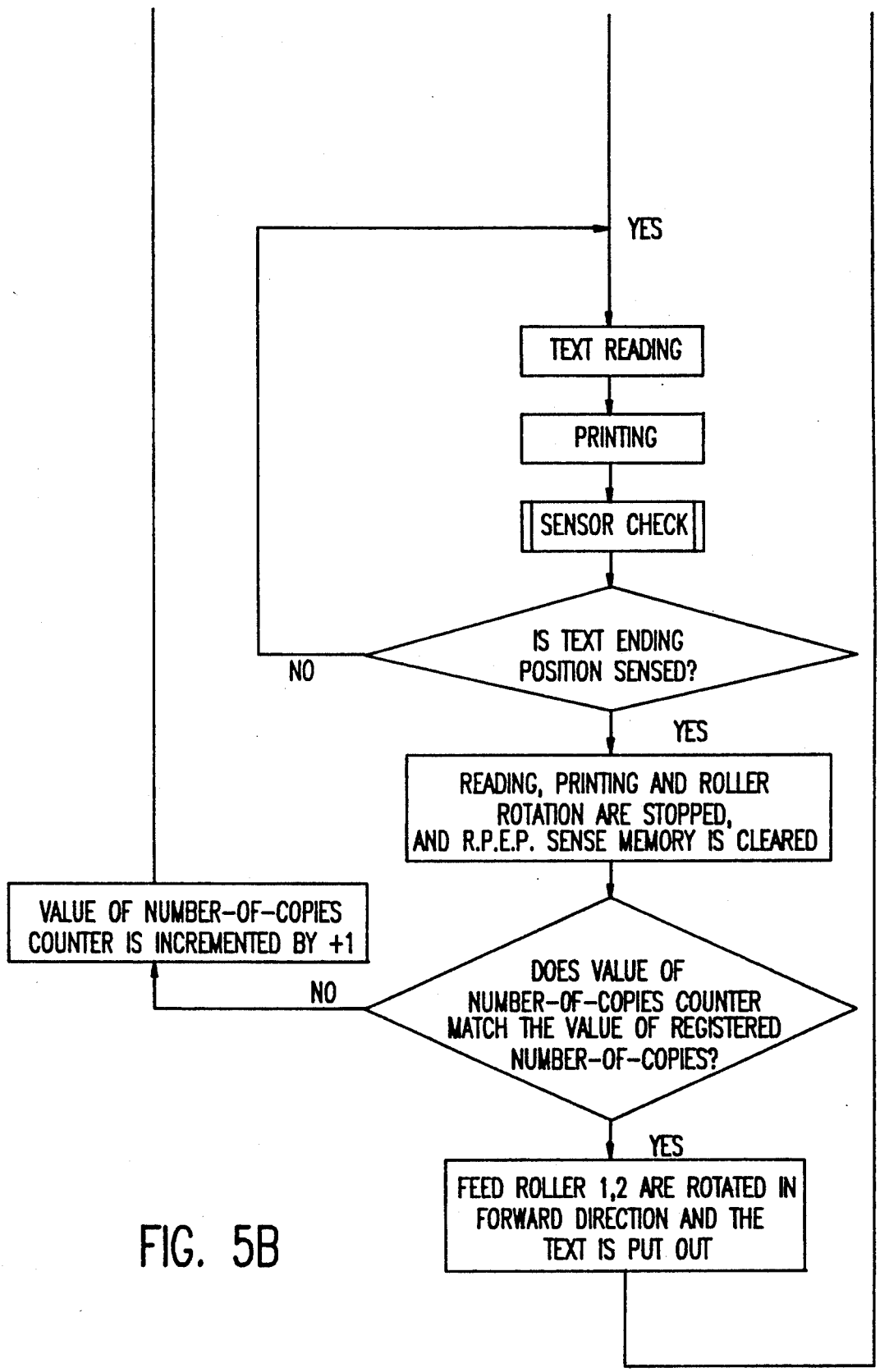

Now, the method of producing a plurality of copies of the text is described in detail with reference to the flow diagram illustrated in FIGS. 5(A) and 5(B) or FIG. 6.

When a user first sets a plural number of copies by controlling the control panel 4, the plural number of copies is stored in the telephone number/number-of-copies registration and storage memory 3.

And when the user orders starting of copying operation, the feed roller 17 and the first and second transfer rollers 19, 26, which are located below the separation rubber board 15, rotate in the forward direction as illustrated in FIG. 2 and FIG. 3(A), and of the plurality of sheets of the text 13 that are placed on the text feed tray 14 just one sheet of the text is transferred to the forward direction by the text guide 18. At this time, the number of copies counter storage memory 2 is set, of course, to 1.

And the text 13 continues to be transferred to the forward direction and by checking position of the text 13 by the first and second sensors 22, 24 the text is checked for the reading position, and if it is sensed that the text 13 is in reading position (state of the first sensor shifts from "off" to "on") the text 13 is read and written via receiver 9 and the reading and writing of the text 13 is repeated while the second sensor 24 continues to be checked for ending position of the text 13.

And when the ending position of the text 13 is sensed (state of the second sensor shifts from "on" to "off"), the reading and writing of the text 13 is stopped and the number-of-copies registration storage memory 3 and the number-of-copies counter storage memory 2 are compared and if the compared numbers are the same, it is determined that copying of the desired number of copies is completed, therefore the text 13 is put out in the forward direction (only the first and second rollers rotate in the forward direction).

But if the compared numbers are not the same, the number of copies counter is incremented by 1 and the operation returns to the initial state.

And then the number-of-transmissions/number-of-copies counter storage memory 2 is checked, and if the number is an odd number, the first and second transfer rollers 19, 26 are rotated in the reverse direction and while the text 13 that is in-between the pinch roller 20 and the second transfer roller 26 is transferred in the reverse direction, the first and second sensors 22, 24 are checked to determined whether or not the text 13 is in reading position, and if the text is in the reading position (state of the second sensor shifts from "off" to "on"), the text is read and written and copying proceeds while the the first sensor 22 is checked continually.

And if ending position of the text is sensed by the first sensor 22 (state of the first sensor shifts from "on" to "off"), the copying operation stops and then repeats as said in the foregoing. That is, just one sheet of the text 13 is transferred, the copying operation is repeatedly performed by the said method, and if there is no more text, the copying operation stops.

As stated in the foregoing description, the two-way scanning facsimile according to the present invention has not only an advantage of being able to perform copying of a plurality of copies of the text without having to be equipped with the massive text storage memory for storing the text by enabling the two-way copying wherein the sensor for sensing reading position of the text and the sensor for sensing the ending position of the text are installed in the text transfer path and by a composition that the feed rollers rotate or reverse-rotate according to signals sensed by those sensors, copying is performed when the text is transferred in the forward direction, and when the ending position of the text is sensed, according to an entered number of copies the text is transferred in the backward direction and copied, and when the ending position of the text in during backward transfer is sensed, the text is transferred in the forward direction and copied; but also an effect of being able to perform the multi-destination calling as described in the foregoing.

The foregoing description shows only a preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. A method for operating a facsimile/copy machine, comprising the steps of:
   a) selecting either of a copy function and a facsimile function for said machine;
   b) entering data into a register to identify a number of readings to be performed with the selected function;
   c) setting a counter to zero;
   d) feeding a sheet of material bearing text through said machine in a first direction;
   e) adding 1 to said counter;
   f) reading the text on said sheet;
   g) comparing said counter number to said number of readings to be performed; and
   h) feeding said sheet in a reverse direction and repeating steps e-g if said counter number is less than said number of readings to be performed, and ejecting said sheet from said machine if said counter equals said number readings to be performed.

2. The method of claim 1, wherein the step of entering data into a register to identify a number of readings comprises entering a number of copies to be made when the copy function has been selected.

3. The method of claim 1, wherein the step of entering data into a register to identify a number of readings comprises entering telephone numbers into said register when the facsimile function has been selected.

4. The method of claim 1, wherein the steps of feeding said sheet of material comprise feeding said sheet with reversible rollers, such that said sheet is fed in said first direction whenever said counter number is odd, and such that said sheet is fed in a direction opposite to said first direction whenever said counter number is even.

5. The method of claim 1, wherein the step of reading text on said sheet further comprises sensing whether text to be read is present; reading said text when said text is sensed as being present; and terminating said reading when no text is sensed as being present.

6. A facsimile/copy machine comprising:
   a feed tray for receiving at least one sheet of material;
   a feed roller for feeding the sheet from said feed tray in a forward direction;
   at least one reversible transfer roller aligned generally parallel to said feed roller for receiving the sheet of material from said feed roller and selectively transferring the sheet either in said forward direction or in a reverse direction;
   A text guide intermediate said feed roller and said reversible transfer roller for permitting movement of a sheet of material from said feed tray to said reversible transfer roller when said transfer roller moves said sheet in said forward direction, and for diverting said sheet from said feed tray and said feed roller when said reversible transfer roller is rotated for moving said sheet in said reverse direction;
   at least one sensor disposed in proximity to said transfer roller for sensing when a sheet with text is in a position to be read; and
   a reader in proximity to said sensor for reading the text on said sheet.

7. The apparatus of claim 6 comprising first and second sensors disposed on opposite respective sides of said reader 8. The apparatus of claim 6 further comprising: register means for storing a number of readings to be performed by said apparatus; counting means for counting the number of readings performed; comparator means for comparing the number of readings performed with the number of readings stored in said register means; means for ejecting said sheet from said apparatus when the number of readings performed equals said number in said register means; and means for reversing said transfer rollers for performing another reading if said number of readings performed is less than said number stored in said register means.

* * * * *